United States Patent [19]

Fanelli et al.

[11] Patent Number: 4,734,237
[45] Date of Patent: Mar. 29, 1988

[54] PROCESS FOR INJECTION MOLDING CERAMIC COMPOSITION EMPLOYING AN AGAROID GELL-FORMING MATERIAL TO ADD GREEN STRENGTH TO A PREFORM

[75] Inventors: Anthony J. Fanelli, Rockaway; Robert D. Silvers, Pompton Lakes, both of N.J.

[73] Assignee: Allied Corporation, Morris Township, Morris County, N.J.

[21] Appl. No.: 863,288

[22] Filed: May 15, 1986

[51] Int. Cl.⁴ .................. C04B 35/64; B29C 45/72; B22F 1/00
[52] U.S. Cl. ........................... 264/122; 264/63; 264/109; 264/328.2; 264/328.14; 264/328.17; 419/36; 501/87
[58] Field of Search ............... 264/328.1, 328.17, 63, 264/109, 122, 328.2, 328.14; 419/36, 37; 501/12, 87, 88, 96, 103, 104

[56] References Cited

U.S. PATENT DOCUMENTS 4,113,480 9/1978 Rivers ..................................... 264/63
4,225,346 9/1980 Helliker et al. ....................... 419/36
4,265,794 5/1981 Pett et al. .............................. 264/63
4,569,821 2/1986 Duperray et al. .................... 419/36

OTHER PUBLICATIONS

Sarkar et al., "Methylcellulose Polymers as Multi Functional . . . ", Ceramics Bulletin, vol. 62, No. 11, pp. 1280–1288, (1983).

Primary Examiner—Jan H. Silbaugh
Assistant Examiner—Neil Michael McCarthy
Attorney, Agent, or Firm—Ernest D. Buff; Gerhard H. Fuchs

[57] ABSTRACT

A process for shaping parts from metallic and/or ceramic powders is disclosed. The process comprises the steps of forming a mixture comprising metal and/or ceramic powders, a gel-forming material having a gel strength, measured at a temperature between 0° C. and about 22° C. and a gel consisting essentially of about 4 wt. % of the gel-forming material and water, of at least about 100 g/cm², and a gel-forming material solvent, and molding the mixture at a temperature sufficient to produce a self-supporting article comprising the powder and a gel. The preferred gel-forming material is an agaroid and the preferred molding process is injection molding.

14 Claims, 7 Drawing Figures

INJECTION MOLDING PROCESS

PROCESS FOR INJECTION MOLDING CERAMIC COMPOSITION EMPLOYING AN AGAROID GEL-FORMING MATERIAL TO ADD GREEN STRENGTH TO A PREFORM

FIELD OF THE INVENTION

This invention relates to processes for shaping metallic and ceramic parts from powders, and molding compositions therefor. More particularly, the invention is directed to molding processes and molding compositions for forming high quality, complex parts which exhibit excellent green strength and which can be readily fired without experiencing the cracking, distortion and shrinkage problems commonly associated with prior art sintered products.

BACKGROUND OF THE INVENTION

The production of sintered parts from "green" bodies is well known in the art. Generally, the green body is formed by filling a die with a powder/binder mixture and compacting the mixture under pressure to produce the green body. The green body, a self supporting structure, is then removed from the die and sintered. During the sintering process, the binder is volatilized and burned out. However, removal of the binder can cause the product to crack, shrink and/or become distorted.

The injection molding of parts from metallic and/or ceramic powders has been a particularly troublesome process. Suitable injection molding compositions must be those which are capable of transforming from a highly fluid state (necessary for the injection step to proceed) to a solid state having a high green strength (necessary for subsequent handling). In order to meet these requirements, the prior art molding compositions comprise a relatively high percentage of a low melting point binder, such as, wax. However, such systems exhibit a number of problems in forming parts, especially parts of complex shapes.

More specifically, waxes are commonly employed as binders because they fulfill the rheological requirements of high fluidity at moderately elevated temperatures and substantial rigidity at temperature below about 15° C. Wax formulations normally comprise between about 10% and about 20% wax by weight of the formula. During the firing process, wax is initially removed from the body in liquid form. During this initial step of the firing process, the green body may disintegrate or become distorted. Consequently, it is often necessary to preserve the shape of the green body by immersing it in an absorbent refractory powder (capable of absorbing the liquid wax). Notwithstanding the use of the supporting powder to retain the shape of the body, products produced from these systems ordinarily shrink and are relatively porous. Moreover, the formation of complex shapes from wax based systems is even more difficult because it requires, in most instances, detailed firing schedules which may encompass several days in an attempt to avoid the development of cracks in the part.

More recently, the use of methylcellulose polymers as binders in the manufacture of parts from metals or ceramic powders has been disclosed. Sarkar et al., in "Methylcellulose Polymers as Multi Functional Processing Aides in Ceramics", *Ceramics Bulletin*, Vol. 62, No. 11, pp. 1281-1288 (1983), disclose the extrusion of honeycombed ceramic structures employing methylcellulose and discuss the "gellation" of methylcellulose-containing solutions at elevated temperatures. In addition, U.S. Pat. No, 4,113,480 discloses the use of methylcellulose or other plastic media (e.g., polyvinyl alcohol) in forming injection molded metallic parts.

We have discovered novel molding compositions useful in forming ceramic and/or metal parts which not only reduce the firing times and regimens for such parts, but also allow for the production of complex shapes without the attendant shrinkage and cracking problems associated with the prior art products.

BRIEF SUMMARY OF THE INVENTION

The invention is directed to a process for shaping parts from ceramics, metals or mixtures thereof which comprises the steps of forming a mixture comprising ceramic and/or metal powders, a gel-forming material having a gel strength, measured at a temperature between 0° C. and about 22° C. on a gel consisting essentially of about 4 weight percent of the gel forming material and water, of at least about 100 g/cm$^2$, and a gel forming material solvent, supplying the mixture to a mold, and molding the mixture under conditions of temperature and pressure to produce a self-supporting structure.

The invention is also drawn to an injection molding process comprising the steps of forming a mixture comprising a ceramic and/or metal powders, a gel-forming material having a gel strength, measured at a temperature between 0° C. and about 22° C. on a gel consisting essentially of about 4 weight percent of the gel-forming material and water, of at least about 100 g/cm$^2$, and a gel-forming material solvent, injecting the mixture at a temperature above the gel point of the gel-forming material into a mold, cooling the mixture in the mold to a temperature below the gel point of the gel-forming material to produce a self supporting structure, and removing the structure from the mold.

The invention is also directed to a composition of matter comprising between about 50 wt % and about 90 wt % ceramic and/or metal powders and at least about 0.5 wt % gel-forming material having a gel strength, measured at a temperature between 0° C. and about 22° C. on a gel consisting essentially of about 4 wt % of the gel-forming material and water, of at least about 100 g/cm$^2$.

DETAILED DESCRIPTION OF THE INVENTION

Figure 1:
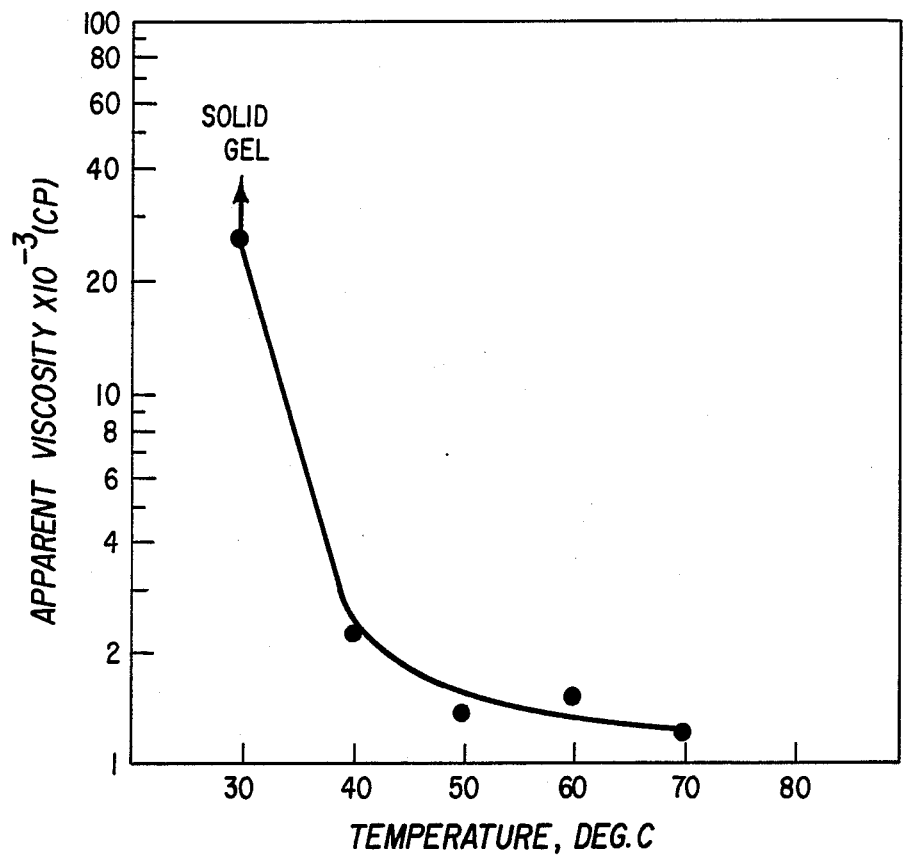
FIG. 1 is a graphic representation of the apparent viscosity of a 2 wt % agar solution at varying temperatures.

Metal, ceramic and metal/ceramic composite parts are formed according to this invention from powdered materials selected from metal powders, ceramic powders and mixtures thereof. As used therein, the term metal powders includes powders of pure metals, alloys, intermetallic compounds, and mixtures thereof. The term ceramic powders as used herein is intended to include, without limitation, powders of such materials as oxides, borides, nitrides, silicides, and carbides of metals, nonmetals or mixtures thereof, and mixtures of such materials.

According to the process, the metal and/or ceramic powders are initially mixed with a gel-forming material and a solvent for the gel-forming material. This mixture is proportioned with a carrier to be fluid enough to enable it to be readily supplied to a die by any of a variety of techniques, and especially by injection molding. Generally, the amount of powder in the mixture is between about 50 percent and about 90 percent by weight of the mixture. Preferably, the powders constitute between about 60 percent and about 80 percent by weight of the mixture, and most preferably constitute between about 65 percent and about 75 percent by weight of the mixture. The preferred and most preferred amounts are quite useful in producing net and near net shape injection molded parts.

The gel-forming material employed in the mixture is a material which exhibits a gel strength, measured at a temperature between 0° C. and about 22° C. on a gel consisting essentially of about 4 wt % of the gel-forming material and water, of at least about 100 g/cm$^2$. This value of gel strength is the minimum value necessary to produce from the mixture an article having sufficient green strength to be handled at ambient temperature without the need for special handling equipment (i.e., self-supporting). As noted above, the minimum gel strength value must be achieved at least at one temperature between 0° C. and about 22° C. Preferably the value of gel strength at a temperature within the range of between 0° C. and about 22° C. is at least about 500 g/cm$^2$, and more preferably the value of gel strength is at least about 1000 g/cm$^2$. In addition, the gel-forming materials are most preferably water soluble. The higher values of gel strength can be particularly useful in producing parts with complex shapes and/or higher weights. Furthermore, higher gel strengths enable the use of smaller amounts of the gel-forming material in the mixture.

Gel strength of the gel-forming material is measured by using an apparatus commonly employed in the manufacture of industrial gums. The apparatus consists of a rod having a circular cross sectional area of 1 cm$^2$ at one end thereof which is suspended above one pan of a triple beam balance. Initially, a large container is placed on each pan of the triple beam balance. The container placed on the pan above which is suspended the rod is filled with about 200 ml (volume) of a gel consisting of about 4 wt % of the gel-forming material and water. The empty container is then balanced against the gel-containing container. The rod is then lowered into contact with the top surface of the gel. Water is then metered into the empty container and the position of the balance pointer is continuously monitored. When the top surface of the gel is punctured by the rod, the balance pointer rapidly deflects across the scale and the water feed is immediately discontinued. The mass of water in the container is then measured and the gel strength, mass per unit area, is calculated.

An additional novel feature of the invention is the use of gel-forming materials which comprise an agaroid. An agaroid is defined as a gum resembling agar but not meeting all of the characteristics thereof. (See H. H. Selby et al., "Agar," *Industrial Gums,* Academic Press, New York, N.Y., 2nd ed., 1973, Chapter 3, p. 29.) As used herein, however, agaroid not only refers to any gums resembling agar, but also to agar and derivatives thereof such as agarose. An agaroid is employed because it exhibits rapid gelation within a narrow temperature range, a factor which applicants have discovered can dramatically increase the rate of production of articles. More importantly, however, we have discovered that the use of such gel-forming materials substantially reduces the amount of binder needed to form a self-supporting article. Thus, articles produced by using gel-forming materials comprising agaroids can significantly enhance the production of net shape and near net shape objects. Moreover, the production of complex articles from agaroid containing mixtures is dramatically improved as a result of the substantial reduction in the firing regimens necessary to produce a fired product. The preferred gel-forming materials are those which are water soluble and comprise agar or, more preferably, agarose, and the most preferred gel-forming materials consist of agar, or more preferably, agarose. FIG. 1 illustrates the basic features of the gel-forming material by graphically depicting the change in viscosity of a preferred gel-forming solution (2 wt % agar solution). The graph clearly illustrates the features of our gel-forming materials: low gel-forming temperature and rapid gelation over a narrow temperature range.

The gel-forming material is provided in an amount between 0.2 wt % and about 6 wt % based upon the solids in the mixture. More than about 6 wt % of the gel-forming material may be employed in the mixture. Higher amounts are not believed to have any adverse impact on the process, although such amounts may begin to reduce some of the advantages produced by our novel compositions, especially with respect to the production of net shape and near net shape bodies. Most preferably, the gel-forming material comprises between about 1 percent and about 4 percent by weight of solids in the mixture.

The mixture further comprises a gel-forming material solvent, the solvent is added in an amount sufficient to dissolve the gel-forming material. While any of a variety of solvents may be employed depending upon the composition of the gel-forming material, particularly useful solvents for agaroid-containing gel-forming materials are polyhedric liquids, particularly polar solvents such as water or alcohols, and liquids such as carbonates. It is, however, most preferable to employ a solvent which can also perform the dual function of being a carrier for the mixture, thus enabling the mixture to be easily supplied to a mold. We have discovered that water is particularly suited for serving the dual purpose noted above. In addition, because of its low boiling point, water is easily removed from the self-supporting body prior to and/or during firing.

A liquid carrier is normally added to the mixture to produce a homogeneous mixture of the viscosity necessary to make the mixture amenable to being molded by the desired molding process. Ordinarily, the liquid carrier is added in an amount greater than is necessary to produce a homogeneous mixture and an amount greater than is required to insure the proper fluidity of the mixture. Thereafter, the mixture is heated to pre-evaporate a portion of the liquid carrier to produce a mixture of the appropriate viscosity for supply to the mold. Generally, the amount of a liquid carrier is an amount (between about 10 percent to about 40 percent by weight of the mixture depending upon the desired viscosity thereof less the amount of solvent employed to dissolve the gel-forming material. In the case of water, which performs the dual function of being a solvent and a carrier for agaroid-containing mixtures, the amount is simply between about 10 percent and about 40 percent by weight of the mixture, with amounts between about 15 percent and about 30 percent by weight being preferred.

The mixture may also contain a variety of additives which can serve any number of useful purposes. For example, dispersants (e.g., Darvan C ®) may be employed to ensure a more homogeneous mixture. Lubricants such as glycerine may be added to assist in feeding the mixture along the bore of an extruder barrel and additives such as glycerine to reduce the vapor pressure of the liquid carrier and enhance the production of the near net shape objects. The amount of additives will vary depending on the additive and its function within the system. However, the additives must be controlled to ensure that the gel strength of the gel-forming material is not substantially destroyed. For example, dispersing agents such as Darvan C ® are ordinarily added in an amount of about 1 percent by weight of the solids in the mixture, whereas glycerine may be added in amounts ranging from about 1 percent to about 10 percent by weight or higher of the mixture without adversely affecting the gel strength of the gel-forming material while maintaining the required performance levels of the additives. Table 1 below lists some typical dispersants and their effect upon the gel strength of the gel-forming material (measured at room temperature). Table 2 describes additives such as lubricants and vapor pressure reducers in amounts which do not adversely effect gel strength.

TABLE 1

|  | Dispersants | Gel Strength (g/cm$^2$) |
| --- | --- | --- |
| Tamol SN | 3 Wt % | 1832 |
| Daxad #27 | 3 Wt % | 1703 |
| Nopcosant L | 2 Wt % | 1605 |
| Solsperse | 3 Wt % | 399 |
| Gum Arabic | 4 Wt % | No Gel |
| Emphos | 3 Wt % | No Gel |

TABLE 2

| Effect of Additives (4 Wt % Additive - 4 Wt % Agar) | |
| --- | --- |
| Additive | Gel Strength (g/cm$^2$) |
| None | 1900 |
| Glycerine | 1900 |
| Ethylene Glycol | 1900 |
| s-Butanol | 1900 |
| Polyacrylonitrile | 1850 |
| Polyethylene | 1550 |

The mixture is maintained at a temperature above the gel point (temperature) of the gel-forming material prior to being supplied to the mold. Ordinarily, the gel point of the gel-forming material is between about 10° C. and about 60° C., and most preferably is between about 30° C. and about 45° C. Thus, while the mixture must be maintained at a temperature above the gel point of the gel-forming material, the gel-forming materials of the present invention substantially reduce the amount of cooling of the mold normally required with the prior art processes. Usually, the temperature of the mixture is maintained at less than 100° C., and preferably is maintained at about 80° C.

The mixture is supplied to the mold by any of a variety of well known techniques including gravity feed systems, and neumatic or mechanical injection systems. Injection molding is the most preferred technique because of the fluidity and low processing temperatures of the mixtures. The latter feature, low processing temperatures, is especially attractive in reducing the thermal cycling (thus increasing mold life) to which molds of the injection equipment are subjected.

A very wide range of molding pressures may be employed. Generally, the modling pressure is between about 20 psi and about 3,500 psi, although higher or lower pressures may be employed depending upon the molding technique used. Most preferably, the molding pressure is in the range of about 40 psi to about 700 psi. An advantage of the present invention is the ability to mold the novel compositions using low pressures.

Figure 2:
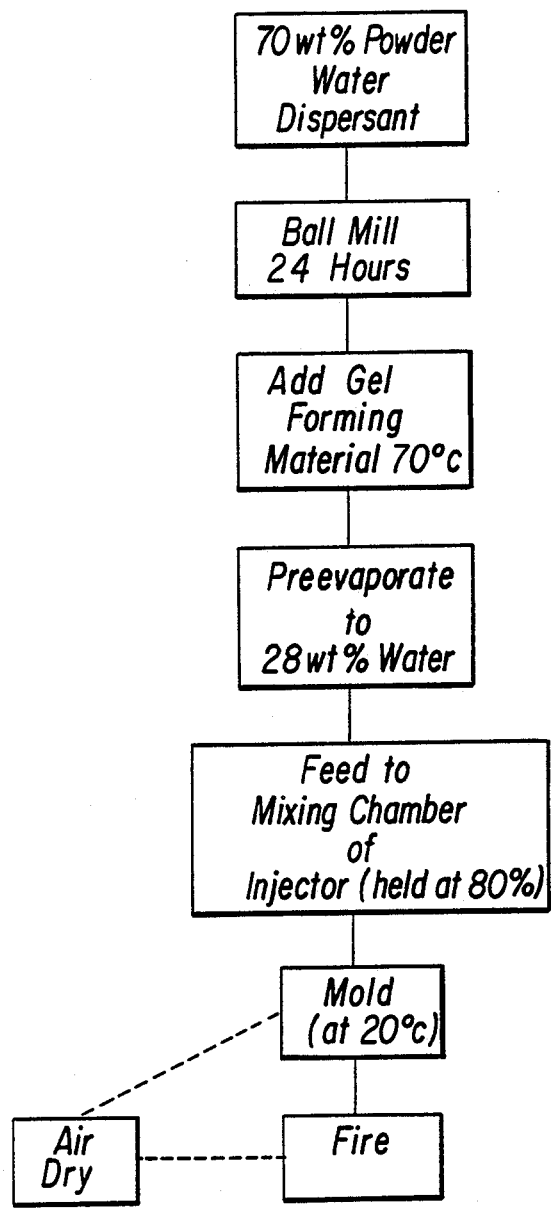
FIG. 2 is a schematic representation of the basic steps of one embodiment of the process of the invention.

The mold temperature must, of course, be at or below the gel point of the gel-forming material in order to produce a self-supporting body. The appropriate mold temperature can be achieved before, during or after the mixture is supplied to the mold. Ordinarily, the mold temperature is maintained at less than about 40° C., and preferably is between about 15° C. and about 20° C. Thus, for example, it is expected that optimum production rates would be achieved with an injection molding process wherein the preferred gel-forming materials (which exhibit gel points between about 30° and about 45° C.) are employed to form a mixture maintained at about 80° C. or less, and wherein the mixture is injected into a mold maintained at about 20° C. or less. FIG. 2 schematically illustrates one embodiment of such a process.

After the part is molded and cooled to a temperature below the gel point of the gel forming material, the green body is removed from the mold. The green body, being a self supporting body, requires no special handling during removal from the mold or during placement into the furnace. The green body is then placed directly into the furnace after being removed from the mold or is further air cooled prior to being placed in the furnace.

In the furnace, the body is fired to produce the final product. The firing times and temperatures (firing schedules) are regulated according to the powdered material employed to form the part. Firing schedules are well known in the art for a multitude of materials and need not be described herein. Because of the use of the novel molding composition of the present invention, no supporting materials are required during firing. Ordinarily, for wax based systems, an absorbant, supporting powder is employed to assist in removing the wax from the part and to aid in supporting the part so that the intended shape of the product is maintained during firing. The present invention eliminates the need for such materials.

Figure 3:
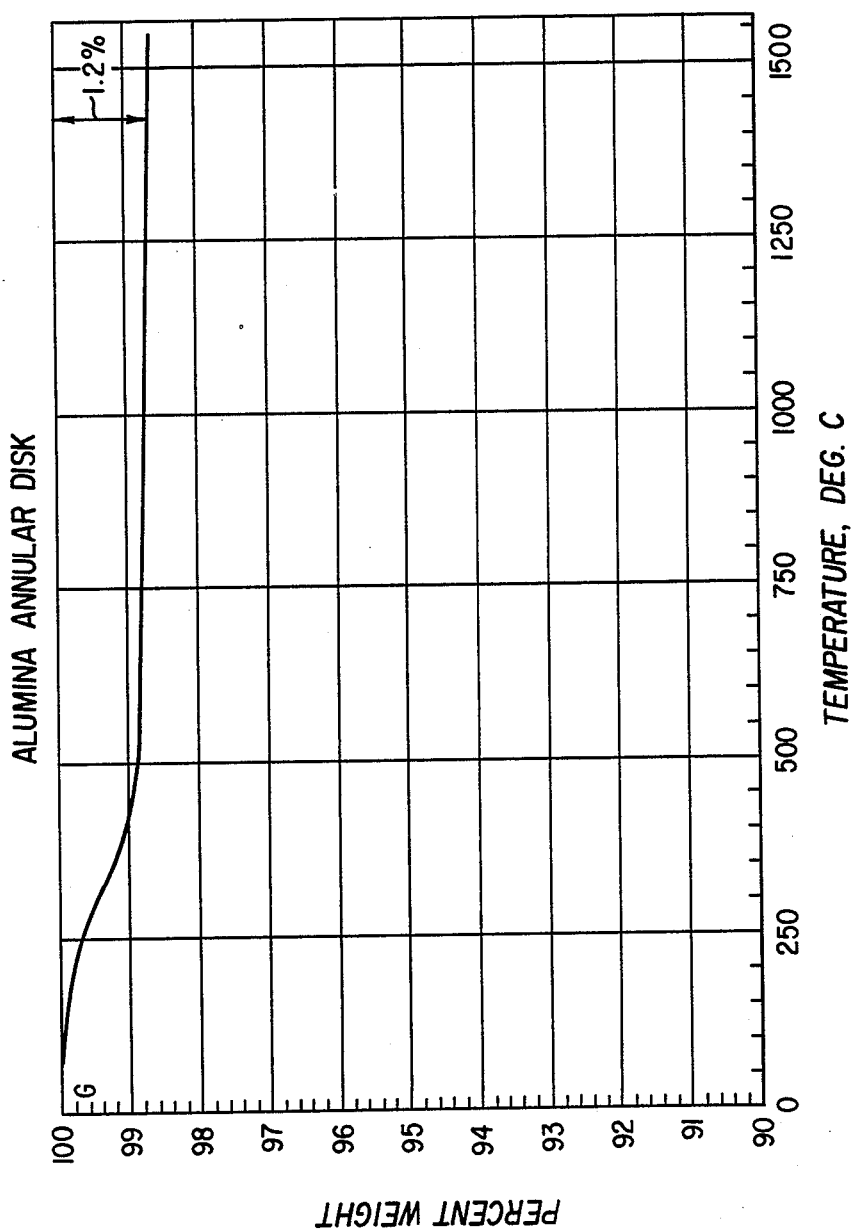
FIG. 3 is a graphic representation of the weight loss exhibited by a product produced by the process of the present invention.

The fired products produced by the present invention can be very dense, net or near net shape products. FIG. 3 illustrates the weight loss exhibited by an injection molded alumina product of the present invention (air dried prior to firing) which was fired to 1600° C. under a firing schedule of 15° C./min. from room temperature (about 22° C.). As shown, the weight loss on firing was a mere 1.2%.

Having described the invention in full, clear and concise terminology, the following examples are provided to illustrate some embodiments of the invention. The examples, however, are not intended to limit the scope of the invention to anything less that is set forth in the appended claims.

EXAMPLE 1

A molding slip was prepared from $Y_2O_3$ and a mixture of $ZrO_2$ powders in the following proportions: 81.0 g $Y_2O_3$ (Molycorp Inc.), 320 g $ZrO_2$ (Zirconia A, Corning Glass Co.), 932.g $ZrO_2$ (Zircar Products, Inc.), 469 g $ZrO_2$ (in-house prepared powder from hydrolysis of zirconium alkoxide). The powders were mixed at 80° C. in the mixing tank of an injection molding machine (Peltsman Model MIGL-28) with 432 g of deionized water and between about 0.6 wt. % and about 0.8 wt. % of agar (Meer Corp, type S-100) to form the molding slip.

Using the composition described above, 10 parts in the form of annular discs 1¼ in O.D×⅜ in. I.D.×⅛ in. thickness, were molded. The tank was kept at 80° C.; the injection pressure was 60 psi; and, a mold filling time of 20 sec. was used during the molding cycle. The die was cooled with flowing tap water. After removal from the die, the parts were allowed to dry in air.

Three of the discs were fired using the following schedule: 2 hrs. to reach 200° C. from room temperature, 3 hr. hold at 200° C., 10 hrs. to reach 1550° C., 2 hr. hold at 1550° C. After the final 2 hr. hold period, the furnace was allowed to cool naturally. During firing, no supporting, absorbent powder or special precautions of any kind were used. This was possible because water, as vapor, was readily liberated from the green pieces at low temperature, leaving the agar to serve as binder. Density was the only property measured (buoyancy method). The mean value for the 3 parts was 4.79±0.19 g/cm$^3$.

EXAMPLE 2

1250 g of 80 wt % $Al_2O_3$/20 wt % clay (ASBP), 875 g of deionized water and 6.25 g of Darvan C ® dispersant were ball milled in a porcelain jar for 24 hrs. After ball milling, the slip was diluted with 250 g of deionized water.

The slip prepared above was combined with an agar solution at 70° C. using a high shear mixer. The agar solution was prepared by dissolving 18.75 g of agar (Meer Corp S-100) in 400 g deionized water at 99°±1° C. Mixing of the combined system was continued for 10 min at 70° C.

The solids concentration of the slip was adjusted to 70 wt % in the heated tank (82° C.) of the injection molding machine by allowing water to evaporate from the open chamber. Periodically, samples of slip were withdrawn from the tank and analyzed by weight loss measurements.

The adjusted slip was used to mold 2 rectangular blocks (3 in×2 in×⅜ in) and 4 annular discs (1¼ in. O.D.×⅜ in. I.D.×⅛ in. thickness). An injection pressure of about 40 p.s.i. and a mold filling time of about 15 sec. were the molding parameters employed. The tank was kept a 82° C. and cooling water (about 15° C.) was flowed through the die after filling was complete. The slip was allowed to remain in the die for 3 min. before opening. After removal from the die, the parts were generally allowed to dry in the open air for about 24 hrs. before firing. Firing was according to the following schedule: 9 hr. ramp from room temperature to 1538° C., 3 hr. hold at 1538° C., 5 hr cool down to 1237° C., 4 hr. cool to 928° C., 4 hr cool to 618° C., and 4 h. cool to 307° C. After reaching 307° C., the furnace was allowed to cool naturally to room temperature.

Physical properties of the ceramic parts are recited in Table 3 below:

TABLE 3

| Sample | Dimensions (in.) Green | Fired |
|---|---|---|
| Block 1 | 2.69 × 1.86 × .288 | 2.21 × 1.45 × 24 |
| Block 2 | 2.68 × 1.89 × .288 | 2.21 × 1.47 × 0.241 |
| Disc 1 | 1.150 O.D. × .109 | 0.960 O.D. × .089 |
| Disc 2 | 1.16 O.D. × 0.111 | 0.963 O.D. × 0.089 |

| Sample | Wt. (g) | Density (g/cm$^3$) | |
|---|---|---|---|
| | Green | Fired | (Theoretical = 3.66) |
| Block 1 | 46.69 | 41.90 | 3.51 |
| Block 2 | 47.69 | 42.49 | 3.49 |
| Disc 1 | 3.24 | 3.04 | 3.54 |
| Disc 2 | 3.24 | 3.04 | 3.52 |

EXAMPLE 3

A molding slip was prepared in accordance with the general procedures outlined in Example 2. Specific details of this particular preparation are as follows:

1500 g ASBP powder (ball milled 24 hrs.) in 807.69 g deionized water containing 25.5 g Nopcosant L ® despersant (Diamond Shamrock Co). The slip was then diluted with 200 g deionized water. A separate agar solution was formed by dissolving 45 g agar (Meer S-100) in 800 g deionized water at 99°±1° C.

The hot agar solution was added to the ceramic suspension held at 70° C. and stirred vigorously with a high-shear mixer. Heating and mixing were continued until enough water evaporated to produce a solid content of 60 wt %. The 60% solids content mixture was supplied to the injection molding machine employed in Example 1 and water was evaporated until 70 wt. % solids content was obtained.

3 rectangular blocks (dimensions as described in Example 2) were molded, 1 each at a pressure of 20, 40 & 60 p.s.i. The tank termperature was 77° C. and 10 sec was allowed to fill the die. Residence times and cooling of the die were the same as in Example 2. No visual differences were observed in the green parts. The blocks molded at 40 and 60 p.s.i. were fired in accordance with the schedule set forth in Example 2. The physical properties of these blocks are described in Table 4 below:

TABLE 4

| Physical and Mechanical Properties | | |
|---|---|---|
| Sample | Dimensions (in.) Green | Fired |
| Block 1 | 2.68 × 1.84 × .282 | 2.15 × 1.52 × .224 |
| Block 2 | 2.69 × 1.82 × .290 | 2.15 × 1.46 × .226 |

| Sample | Wt. (g) Green | Fired | Density g/cm$^3$ |
|---|---|---|---|
| Block 1 | 40.12 | 38.34 | 3.51 |
| Block 2 | 40.19 | 38.75 | 3.51 |

The blocks were then sliced and machined into bars, 2 in.×¼ in.×¼ in., for modulus of rupture (3-point) measurements. The results of the 3-point measurements are set forth in Table 5 below:

TABLE 5

| Hardness (Vickers, kg/mm$^2$) | Flexural Strength (KSI) | Fracture Toughness* MPa m $\frac{1}{2}$ |
| --- | --- | --- |
| 942 ± 37 | 46.6 ± 0.8 | 2.7 |

*ISB method. See R. F. Cook and B. K. Lawn, J. Am. Cer. Soc. PC-200, Nov(1983).

EXAMPLE 4

Three molding slips were prepared according to the procedure described in Example 3 and modified as follows. In each instance, Darvan C ® was used as the dispersant in place of Nopcosant ®L. It was present at 4 wt % based on the amount of ceramic powder.

Slip A

The agar concentration amounted to 1.5 wt % of the ASBP powder. Before molding, glycerine was added to the composition at 1 wt % based on the ceramic powder.

Eighteen small, hollow, cylinders 0.97 in. long by 0.27 in. at their outer diameter were molded under the following molding parameters: tank temperature 82° C., 40 p.s.i. and 10 sec. cycle time. Six of the parts were fired using the schedule described in Example 3. The fired parts underwent a change from 0.625±0.008 g to 0.548±0.015 g in weight, 0.91±0.01 in. to 0.73±0.01 in. in length, and 0.264±0.002 in. to 0.215±0.002 in. at the outer diameter.

Slip B

The agar concentration of the mix increased to 2.5 wt % by addition of a prepared agar solution as described in Example 3. The solids level was readjusted to 70 wt % by evaporating water from the tank. Eighteen hollow cylinders (dimensions as described above) were molded using this composition and six were fired. Average dimensional changes, as a result of firing, were 0.906±0.006 in. to 0.73±0.007 in. and 0.264±0.002 in. to 0.215±0.002 in. in the length and outer diameter, respectively.

Slip C

The agar concentration was further increased to 3.5 wt % (solids basis) and the total solids concentration was re-adjusted to 70 wt % as above. Eleven cylinders were molded and 8 fired. Average firing shrinkages were: length, 17.82±0.42%, and outer diameter, 17.89±0.57%.

EXAMPLE 5

A relatively dilute composition (55 wt % solids) was employed. The molding slip (prepared as described in Example 3) contained 619 g ASBP, 3.2 g Darvan C ®, 9.3 g agar, and 511 g deionized water.

Sixteen hollow cylinders (of dimensions described in Example 4) were molded and 5 were fired (under the conditions set forth in Example 3). The dried, green cylinders on firing underwent changes in average length from 0.788±0.042 in. to 0.606±0.032 in. and in outer diameter from 0.221±0.014 in. to 0.166±0.011 in. While satisfactory parts were obtained from this composition, the dilute nature of the mixture was reflected in the weights of the final parts. These cylinders (fired) weighed 0.302±0.028 g.

EXAMPLE 6

To illustrate the negative effects from the use of absorbent powder during firing, hollow cylinders (dimensions as in Example 4) were molded and fired using the molding parameters and firing schedule described in Example 4.

1500 g ASBP was mixed with 919 g deionized water and 70.4 g Tamol SN ® solution. The mixture was then diluted with 200 g deionized water. An agar solution formed from 45 g agar in 800 g deionized water was added to the mixture and the solids level was adjusted to produce a final molding slip of 70 wt % solids.

Prior to firing, one part was placed in contact with an absorbent powder (Alcoa A-16 alumina, calcined at 1700° C.) and one part was left free standing and out of contact with any powder. The parts were fired as described in Example 4 above, and then examined by scanning electron microscope.

Figure 4A:
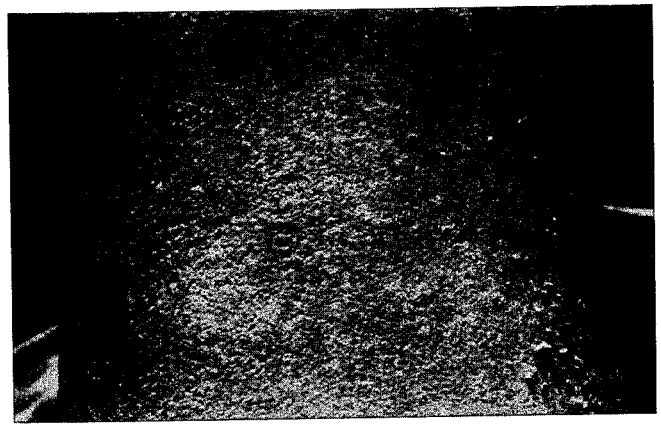
FIGS. 4a and 4b are photomicrographs of the surface of fired part in contact with an absorbent supporting material (commonly employed in prior art wax-based molding systems).
Figure 4B:
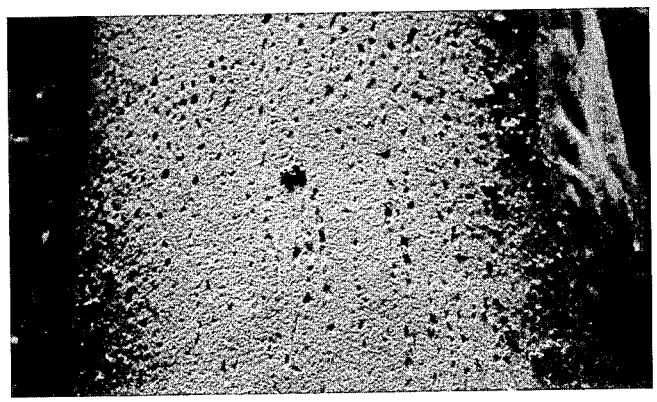
Figure 5A:
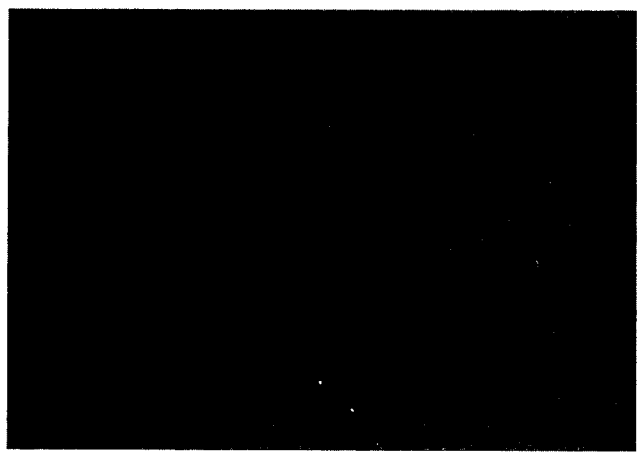
FIGS. 5a and 5b are photomicrographs of the surface of a fired part produced by a process within the scope of the present invention.
Figure 5B:
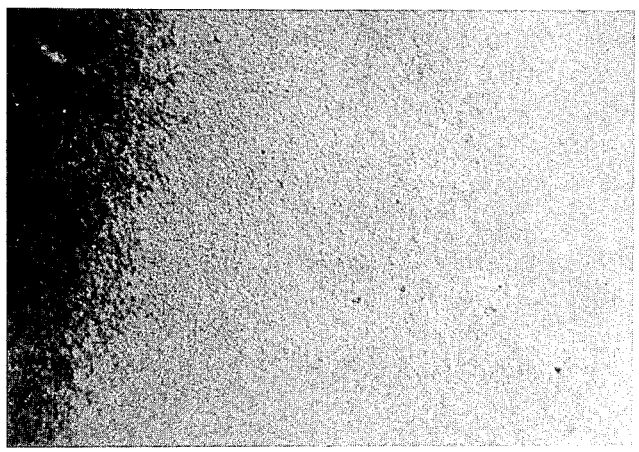

The deleterious effects arising from use of the absorbent powder during firing can be seen by reference to FIGS. 4a, 4b, 5a, and 5b. FIGS. 4a and 4b are photomicrographs of a fired surface that had been in contact with the absorbent powder. FIG. 5a and 5b show the surface of a similar part that was unsupported. The presence of adhering powder and pock-like defects as a result of contact between the ceramic and the absorbent powder are revealed clearly in FIGS. 4a and 4b. FIGS. 5a and 5b show no such defects.

The use of absorbent powders to support green parts during firing is the method normally employed with wax-based systems. It is used because the wax melts at elevated temperatures and, unless wicked away with a material which also serves to support the powder, causes the product to deform, e.g. slump, when the liquid wax flows from the body during firing.

The system of the present invention not only produces parts of high theoretical density but also eliminates the need for support materials such as absorbent powders, thus avoiding the problem of creating surface defects in the fired parts.

EXAMPLE 7

An Alumina molding composition was prepared using the process described in Example 3 from the following materials:

1500 g of Al$_2$O$_3$ was mixed with 807.7 g of deionized water and 15 g of Darvan ®C dispersant. The solution was diluted with 200 g deionized water. To the mixture was added an agar solution composed of 45 g agar/1000 g deionized water. The final molding mix contained 70 wt % solids.

Two rectangular blocks (dimensions in Example 3) were molded under the following conditions: mixing tank temperature 77° C.; injection pressure 40 p.s.i.; and filling time 10 sec. After drying overnight in air, the blocks were fired (schedule: 10 hrs, room temperature to 1600° C.; 2 hr. hold at 1600° C.; and natural cooldown).

The blocks were sliced and ground (220 mesh diamond wheel) into MOR (modulus of rupture test) bars as in Example 3. The results of the 3-point test (described in Example 3) for the bars produced by this procedure are reproduced in Table 6 below:

TABLE 6

| Density, (g/cm$^3$) | Hardness (Vickers, kg/mm$^2$) |
| --- | --- |
| 3.76 | 1467 ± 91 |
| Fracture Toughness (MPa m $\frac{1}{2}$) | Flexural Strength (K.S.I.) |

TABLE 6-continued

| 2.5 | 44.2 ± 0.9 |
| --- | --- |

We claim:

1. A method of forming an article comprising the steps of:
   (a) forming a mixture comprising
      (1) powders selected from the group consisting of metal powders, ceramic powders, and mixtures thereof,
      (2) an agaroid gel-forming material having a gel strength, measured at a temperature between 0° C. and about 22° C. on a gel consisting essentially of about 4 wt % of the agaroid gel-forming material and water, of at least about 500 g/cm², and
      (3) an agaroid gel-forming material solvent;
   (b) heating the mixture to a first temperature above the gel point of the agaroid gel-forming material to solubilize the agaroid gel-forming material, said first temperature being in the range from 80° C. to 100° C.;
   (c) supplying the mixture to a mold; and
   (d) molding the mixture at a second, cooler temperature at or below the gel point of the agaroid gel-forming material to produce a self-supporting article comprising the powders and a gel comprising the agaroid gel-forming material, said second, cooler temperature being in the range from 15° C. to 45° C.

2. The method of claim 1 wherein the powders comprise between about 50% to about 90% (by weight) of the mixture.

3. The method of claim 1 wherein the gel forming material comprises between about 0.2% and about 6% by weight of the mixture.

4. The method of claim 1 further comprising the step of maintaining the mixture at a temperature above the gel point of the gel-forming material prior to the molding step (b).

5. The method of claim 3 wherein the mixture further comprises a glycol.

6. The method of claim 5 wherein the glycol is present in an amount up to about 10% by weight of the gel-forming material and the gel forming solvent in the mixture.

7. The method of claim 1 wherein the agaroid is agar, agarose, or a mixture thereof.

8. The method of claim 3 wherein the agaroid is agar, agarose, or a mixture thereof.

9. An injection molding process comprising the steps of:
   (a) forming a mixture comprising
      (1) powders selected from the groups of metal powders, ceramic powders and mixtures thereof,
      (2) an agaroid gel-forming material having a gel strength, measured at a temperature between 0° C. about 22° C. on a gel consisting essentially of about 4 wt % of the agaroid gel forming material and water, of at least about 500 g/cm²,
      (3) an agaroid gel-forming material solvent, and
      (4) a carrier;
   (b) injecting the mixture into a mold, the mixture being maintained prior to the injection step at a first temperature above the gel point of the agaroid gel-forming material, said first temperature being in the range from 80° C. to 100° C.; and,
   (c) cooling the mixture in the mold to a second temperature below the gel point of the agaroid gel-forming material to form a self supporting article comprising the powders and a gel comprising the agaroid gel-forming material, said second temperature being in the range of 15° C. to 45° C.

10. The process of claim 9 wherein the powders are present in the mixture in an amount between about 50% and about 90% by weight of the mixture, the gel forming agent is present in the mixture in an amount between about 0.2 and about 6% by weight of the mixture, and the solvent is present in an amount sufficient to dissolve the gel-forming material at the first temperature and to function as the carrier.

11. The process of claim 9 wherein the mixture further comprises a glycol.

12. The process of claim 11 wherein the glycol is present in an amount up to about 10% by weight of the gel forming material and the solvent in the mixture.

13. The method of claim 9 wherein the agaroid is agar, agarose, or a mixture thereof.

14. A composition of matter comprising powder selected from the group consisting of metal powder, ceramic powder and mixtures thereof and, mixed therewith, an agaroid gel-forming material having a gel strength, measured at a temperature between 0° C. and about 22° C. on a gel consisting essentially of about 4 wt % of the agaroid gel forming material and water, of at least about 500 g/cm².

* * * * *